US006227993B1

(12) United States Patent
Medebach

(10) Patent No.: US 6,227,993 B1
(45) Date of Patent: May 8, 2001

(54) CABLE REVERSING SYSTEM FOR AN AUTOMATIC WINDOW LIFT

(75) Inventor: Thomas Medebach, Wetzlar-Dudenhofen (DE)

(73) Assignee: Kuster & Co. GmbH, Ehringshausen (DE)

( * ) Notice: Subject to any disclaimer, the term of this patent is extended or adjusted under 35 U.S.C. 154(b) by 0 days.

(21) Appl. No.: 09/216,869

(22) Filed: Dec. 21, 1998

(51) Int. Cl.[7] .............................. F16H 57/02; F16H 7/20
(52) U.S. Cl. .............................................. 474/144; 474/165
(58) Field of Search .................................... 474/144, 145, 474/147, 165, 78; 74/500 K, 513, 501, 575, 577 R, 505, 506, 527, 504, 89.22, 89.14; 244/161, 135; 49/352, 375, 123, 115; 440/67, 87; 160/168.1, 168 R, 166 A, 900, 345; 16/95, 96

(56) References Cited

U.S. PATENT DOCUMENTS

| | | | | |
|---|---|---|---|---|
| 3,951,195 | * | 4/1976 | Salzmann | 160/345 |
| 4,110,935 | * | 9/1978 | Sessa | 49/352 |
| 4,402,109 | * | 9/1983 | Ohman et al. | 16/96 D |
| 4,838,820 | * | 6/1989 | Boda et al. | 440/67 |
| 4,905,938 | * | 3/1990 | Braccio et al. | 244/101 |
| 4,936,370 | * | 6/1990 | Urecker et al. | 160/168.1 |
| 4,977,795 | * | 12/1990 | McVey | 74/575 |
| 5,040,430 | * | 8/1991 | Adam et al. | 74/89.14 |
| 5,235,866 | * | 8/1993 | Truman et al. | 74/89.22 |

FOREIGN PATENT DOCUMENTS

| | | | |
|---|---|---|---|
| 3145277 | | 1/1983 | (DE) . |
| 36 15 578 | | 5/1986 | (DE) . |
| 36 38 059 | | 5/1987 | (DE) . |
| 41 31 098 | | 3/1993 | (DE) . |
| 4240030 | | 6/1994 | (DE) . |
| 3434850 | * | 9/1994 | (DE) . |
| 0 385 167 | | 2/1990 | (EP) . |
| 0 744 522 | | 5/1996 | (EP) . |
| 1448795 | * | 8/1976 | (GB) . |
| 2087973 | | 6/1982 | (GB) . |
| 84412 | * | 1/1996 | (JP) . |

* cited by examiner

*Primary Examiner*—David A. Bucci
*Assistant Examiner*—Marcus Charles
(74) *Attorney, Agent, or Firm*—Liniak, Berenato, Longacre & White

(57) ABSTRACT

A cable reversing system for an automatic window lift having a cable reversing part affixed to a rail. The cable reversing part defines a housing enclosing a cable pulley. The cable pulley has two bearing stubs which snap into corresponding clearances in the cable reversing part so that the cable pulley is supported in a geometric interlocking manner inside the cable reversing part.

3 Claims, 4 Drawing Sheets

CABLE REVERSING SYSTEM FOR AN AUTOMATIC WINDOW LIFT

BACKGROUND OF THE INVENTION

1. Field of the Invention

The invention relates to a cable reversing system for an automatic window lift.

2. Description of the Prior Art

The European patent document 385,167 A1 describes a cable reversing system for bowden-cable actuated window lifts of motor vehicles. In such a bowden-cable driven window lift, a cable transmits force directly from a drive to a mechanism acting on the window pane. This cable drive entails several different cable reversals inside the vehicle door. The cable reversal is implemented either by molded parts that force the cable over slide paths into the desired direction, or by cable pulleys allowing nearly frictionless cable reversal when compared to the case of the molded parts. The known cable reversing part is connected to a cross-sectionally contoured rail, herein "section rail", mounted inside the door box and can be hooked by a detent mechanism to the section rail, the shaft of the cable reversing system being integral with the cable reversing system. The reversing pulley can be mounted already before the pulley is mounted on a shaft and be secured using an expansion ring, though at the cost of some labor procedure.

In general significant cable forces are applied to the reversing pulleys of the bowden-cable window lifts and, depending on the configuration of the window-lift affixation points relative the bearings of the reversing pulleys, these forces may cause substantial leverage or bending torques.

The German patent document 36 15 578 C1 discloses apparatus to raise and lower a vehicle window pane and comprising four stationary reversing pulleys enclosed by a closed bowden cable passing through a displacement actuator and connecting to holding means affixed to the window pane. This known apparatus is mounted on a guide frame supporting all apparatus components and is fitted with guide posts connected by crossbeams and with guide channels to guide the holding means connected to the bowden cable. This design incurs the drawback that its guide frame is bulky, especially because of the distances, some significant, between its affixation points and the bearings of the reversing pulleys, in order to withstand cable forces or to allow for premature wear. As a result this known apparatus is comparatively heavy.

To date, it has been conventional practice to place the affixation points of a bowden-cable window lift in the guide rails or at retaining angles or base plates mounted to these rails, the retaining angles sometimes being fitted with reversing pulleys and in such designs being affixed to the ends of the guide rails (German patent document 36 38 059 C2).

It is further known to fit a borehole into the cable reversing part and the section rail and to rivet in place the cable reversing pulley (German patent document 41 31 098 C2). During its assembly to the vehicle, the reversing pulley is screwed into the vehicle sheetmetal. This design entails a comparatively large number of parts to mount the cable pulley or the cable reversing part.

The European patent document 0,744,522 A1 discloses a cable reversing part, used for window lifts, which can be hooked into a support beam, the reversing pulley being seated on a comparatively large plastic shank. This pulley is held in place on one side by the plastic of the cable reversing part and on the other side by the metal of the support beam. There is the possibility at high tensions in the cable that the mutually displaceable shank parts supporting the reversing pulley shall warp, entailing higher friction and perhaps wear.

SUMMARRY OF THE INVENTION

It is the objective of the present invention to improve apparatus of the initially cited kind to such an extent that the cable reversing apparatus shall consist of few parts and shall be assembled into the vehicle in more rapid and simpler manner while nevertheless assuring reliable transmission of the high forces involved.

This problem is solved by the invention by a cable reversing system.

The heart of the invention is to support the cable pulley in geometrically interlocking manner inside a basic component, namely the cable reversing part, the two components being combined only during installation in the vehicle. The cable reversing part assumes the form of a housing enclosing the cable pulley. During assembly the cable is preferably laid on the cable pulley and thereupon the entire component is affixed to the vehicle. This procedure substantially simplifies assembly. Advantageously, additional components are needed neither in stock nor in the assembly procedure consisting of the simple connection of the cable reversing part and cable pulley. The invention offers the further advantage that the cable can be pushed through the cable reversing part while forming a loop and the cable pulley thus shall be affixed only subsequently. Advantageously, this combination can also be implemented when being the last component in the window lift assembly. First, the reversing arcs together with the cable being affixed to the rails and thereafter there the cable reversing part is inserted. In the invention, the cable pulley comprises two bearing stubs which may enter matching clearances in the cable reversing part or which may be appropriately hooked up. These clearances may be elongated slots or standard (round) holes to seat and support the operational reversing pulley.

In one embodiment mode, the cable pulley can be merely hooked or snapped into the cable reversing part. This design substantially simplifies installation because eliminating the need for special tools or the use of screws or other fasteners.

In a preferred embodiment, the walls of the cable reversing part comprising the clearances are resilient and as a result the cable reversing pulley, together with its bearing stubs, can be inserted and then shall be reliably held in the clearances once the wall material elastically returns into its original state.

To simplify such insertion, insertion bevels may be provided at the clearances allowing to easily guide the bearing stubs into the clearances wherein they will be held captive. Such constrained guidance facilitates assembly again and eliminates mistakes.

An embodiment of the invention is elucidated in the following description and in relation to the attached drawings.

DESCRIPTION OF THE PREFERRED EMBODIMENTS

Figure 1:
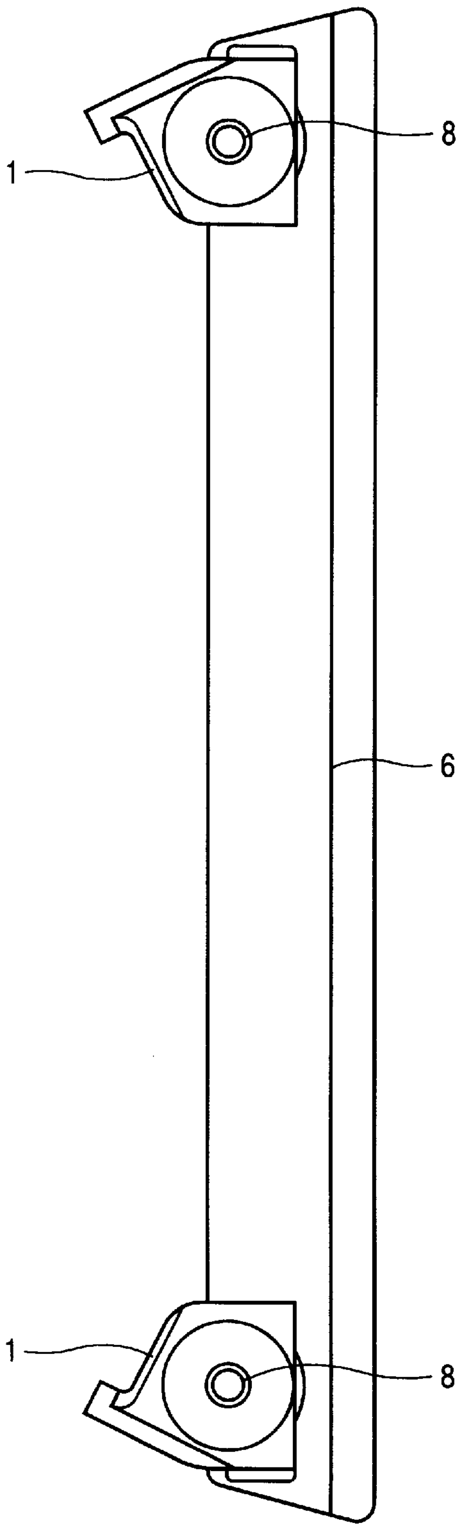
FIG. 1 is an overview of a window-lift mechanism with two cable reversing systems.

FIG. 1 shows two cable reversing parts 1 of the invention fitted with cable pulleys 8 mounted to a section rail 6 inside an omitted vehicle door. The cable reversing parts 1 assume the form of housings each substantially enclosing the cable pulley 8 while obviously clearances are provided both for the incoming and the outgoing cable.

Figure 2:
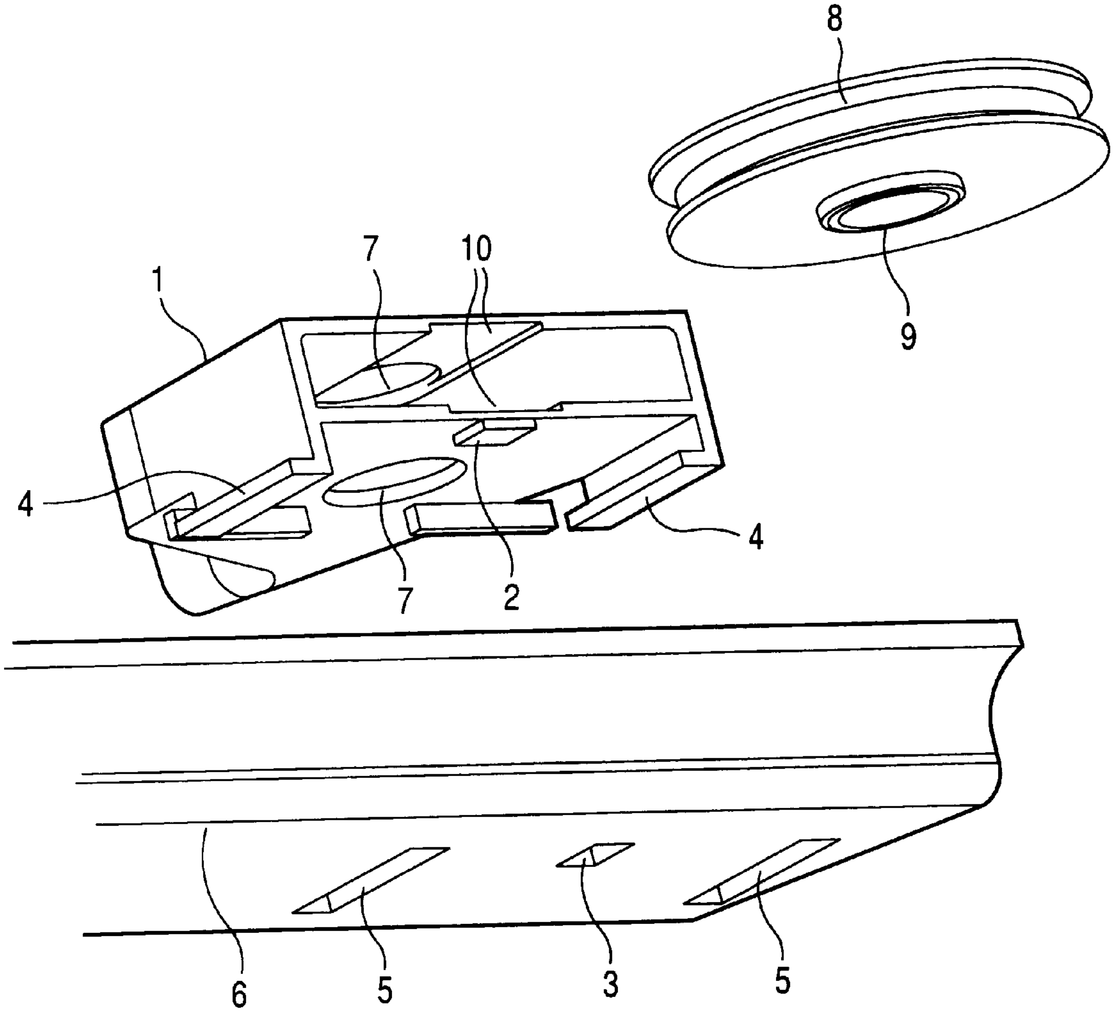
FIG. 2 shows a cable reversing system of the invention in a first assembly stage.

FIG. 2 shows the cable reversing part 1 of the invention and the cable pulley 8 when in a first assembly stage, that is, when separate. The cable reversing part 1 assumes the shape of a housing and can be snapped in position by means of a detent guide 2 into a clearance 3 of the section rail 6. Additionally, offsets 4 are present at the sides of the cable reversing part 1 and, when in their assembly position, enter matching clearances 5 of the section rail 6 and reach behind the latter, thereby assuring reliable seating and transmission of tension from the pulley 8 to the section rail 6. Inside its housing, the cable reversing part 1 comprises two mutually opposite clearances 7 which are circular in this embodiment. Bearing stubs 9 are present centrally at the two opposite sides of the cable pulley 8 and, when in their assembly position (FIG. 4), enter and snap into matching clearances 7 of the cable reversing part 1. Thus reliable bearing of the cable pulley 8 is assured in the cable reversing part 1.

Essentially the size of the housing depends on the pulley size. In particular, the housing depth shall not be substantially larger than the depth of the pulley, inclusive of its bearing stubs.

FIG. 2 shows the housing being additionally fitted with one or two insertion bevels 10 to insert the bearing stubs 9. When the cable pulley 8 is inserted, the mutually opposite walls of the preferably plastic cable reversing part 1 will be forced outward. At the time the bearing stubs 9 snap into the clearances 7, these housing walls resiliently return into their initial state, thereby securing geometric locking and reliable retention of the cable pulley 8 inside the cable reversing part 1.

Figure 3:
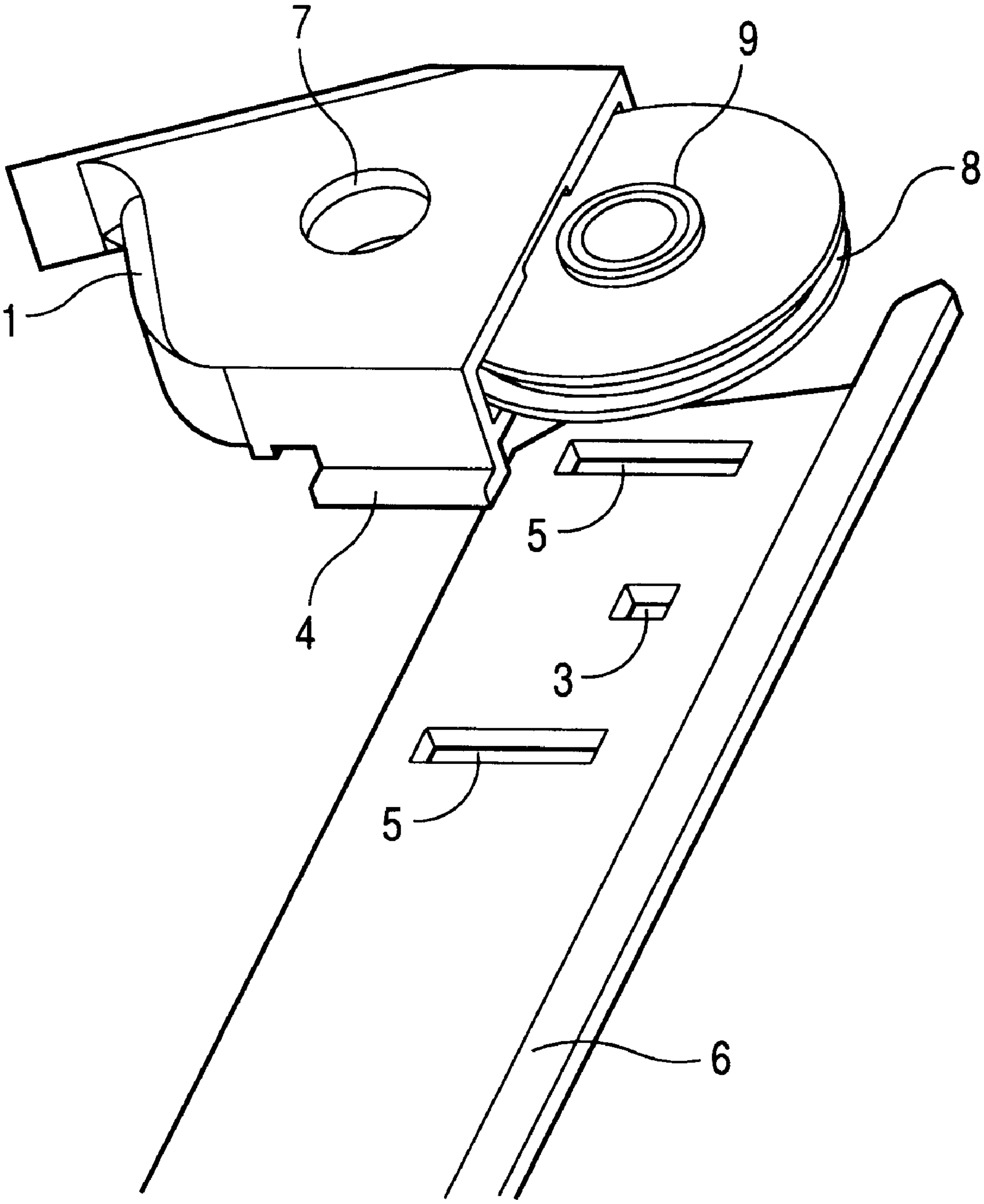
FIG. 3 shows the cable reversing system of the invention in a second assembly stage.

FIG. 3 shows, in another perspective, the cable reversing part 1 together with the cable pulley 8 in a second assembly stage, namely shortly before the cable pulley 8, by its bearing stubs 9, will be snapped into the clearances 7 of the cable reversing system 1. The Figure again shows the offsets 4 of the cable reversing part 1 which will enter matching clearances 5 of the section rail 6 and shall assure reliably holding the cable reversing part 1 against the section rail 6 affixed to the vehicle.

Figure 4:
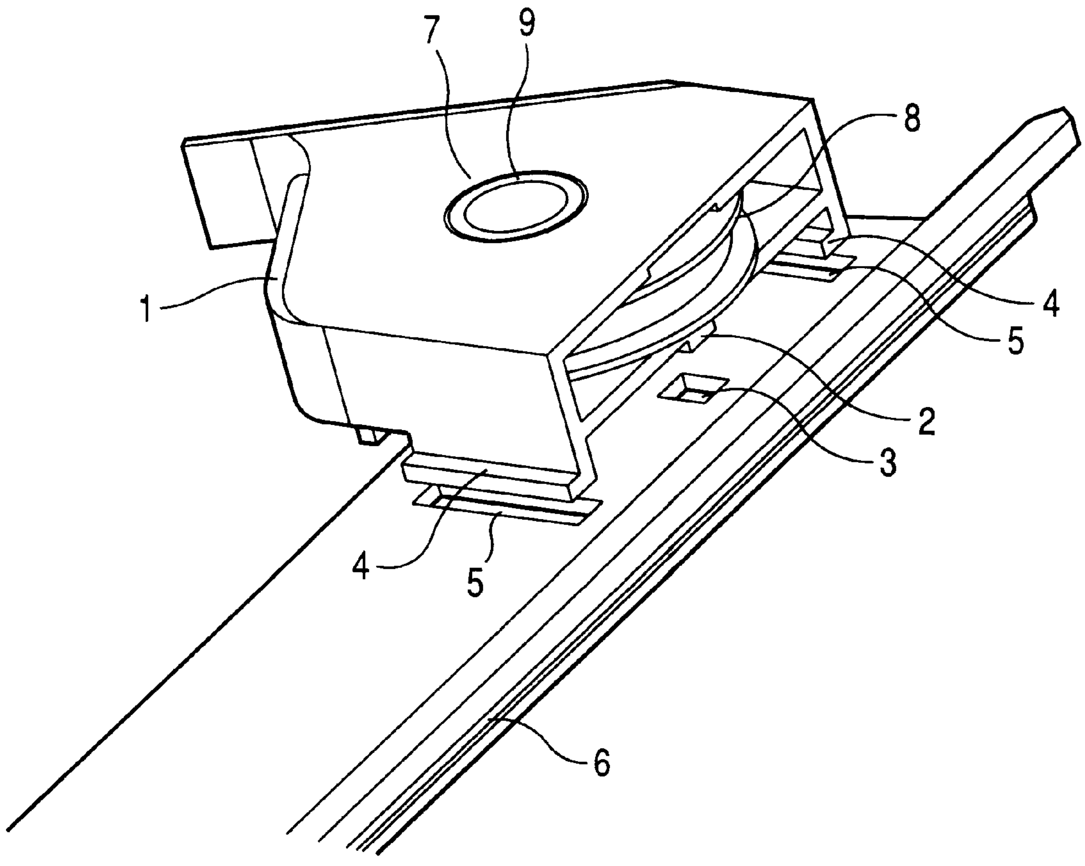
FIG. 4 shows the cable reversing system in its final affixation to a section rail.

Lastly FIG. 4 shows the fully assembled cable reversing system; the cable pulley 8 now is snapped into the cable reversing part 1 of which the affixation to the section rail 6 is imminent. In other words, the offsets 4 are about to be inserted into their clearances 5, and the detent guide 2 is about to be inserted into the clearance 3 of the guide rail 6.

While the foregoing has been shown and described with respect to preferred embodiments, it will be understood by those possessing skill in the art that various changes and modification may be made without departing from the spirit and scope of the invention.

What is claimed is:

1. A cable reversing system for a cable actuated motor-vehicle lift, said system comprising:

a cable-reversing part (1) affixed to a rail (6); and a cable pulley (8), wherein the cable reversing part (1) is in the shape of a housing and encloses the cable pulley (8), the cable pulley (8) includes two bearing stubs (9) snap fit within corresponding clearances (7) in the cable reversing part (1), said cable reversing part (1) comprising mutually opposite walls that are forced apart when the cable pulley is inserted into said clearances and said opposite walls thereafter resiliently return into an initial state, whereby the cable pulley (8) is supported in a geometrically interlocking manner inside the housing (1).

2. The cable reversing system as claimed in claim 1, said cable reversing part further comprises insertion bevels (10) running toward the clearances (7) and thereby allowing insertion of the bearing stubs (9) into the clearances (7).

3. The cable reversing part according to claim 2, wherein said clearances (7) are opposing circular openings formed in opposite walls of said housing, and said insertion bevels are formed as a reduced thickness of each of said opposite walls provided to facilitate insertion of said bearing stubs there along and retention within said clearances in a snap fit fashion.

* * * * *